(12) United States Patent
Hickson et al.

(10) Patent No.: US 7,240,349 B2
(45) Date of Patent: Jul. 3, 2007

(54) PERSISTENT MESSAGING IN A TRANSACTION PROCESSING ENVIRONMENT

(75) Inventors: Andrew Ian Hickson, West Wellow (GB); Peter David Niblett, Whitchurch (GB); David Ware, Downton (GB)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/324,673

(22) Filed: Dec. 20, 2002

(65) Prior Publication Data

US 2004/0088712 A1    May 6, 2004

(30) Foreign Application Priority Data

Nov. 5, 2002   (GB) .................... 0225733.5

(51) Int. Cl.
*G06F 9/46* (2006.01)
(52) U.S. Cl. ...................... 719/314; 718/101
(58) Field of Classification Search .......... 719/310, 719/313–315; 718/1, 100, 101; 709/215, 709/230
See application file for complete search history.

(56) References Cited

U.S. PATENT DOCUMENTS

| | | | | |
|---|---|---|---|---|
| 5,278,984 A | * | 1/1994 | Batchelor | 719/314 |
| 5,844,980 A | * | 12/1998 | Patel et al. | 379/88.22 |
| 5,878,056 A | * | 3/1999 | Black et al. | 714/748 |
| 5,999,964 A | | 12/1999 | Murakata et al. | 709/201 |
| 6,012,094 A | * | 1/2000 | Leymann et al. | 709/230 |
| 6,141,701 A | | 10/2000 | Whitney | 710/5 |
| 6,425,017 B1 | * | 7/2002 | Dievendorff et al. | 719/315 |
| 6,434,605 B1 | | 8/2002 | Faulkner et al. | 709/213 |
| 6,493,826 B1 | * | 12/2002 | Schofield et al. | 726/22 |
| 6,529,932 B1 | * | 3/2003 | Dadiomov et al. | 718/101 |
| 6,625,117 B1 | | 9/2003 | Chen et al. | 370/227 |
| 6,658,458 B1 | * | 12/2003 | Gai et al. | 709/215 |
| 6,920,636 B1 | * | 7/2005 | Dievendorff et al. | 719/315 |
| 6,999,996 B2 | | 2/2006 | Sunderland | 709/208 |
| 7,068,604 B2 | | 6/2006 | Chen et al. | 370/235 |
| 7,127,507 B1 | | 10/2006 | Clark et al. | 709/224 |

OTHER PUBLICATIONS

Microsoft Message Queuing Services: A Guide to Reviewing Microsoft Message Queuing Server release 1.0- The Message Queuing Services of Windows NT, 1997 Microsoft Corporation, pp. 1-21.*

Zimran et al. "Performance Analysis of Distributed Client-Server Message Queuing", 1994 IEEE, pp. 550-555.*

Chen et al. "Dynamic Queue Assignment in a VC Queue manager for Gigabit ATM networks", 1998 IEEE, pp. 3-10.*

* cited by examiner

*Primary Examiner*—Van H. Nguyen
(74) *Attorney, Agent, or Firm*—Duke W. Yee; Jerry W. Herndon; Gerald H. Glanzman

(57) ABSTRACT

A method and computer program product is provided for sending a persistent message in a transaction-enabled messaging and queuing system. A message queue manager is responsible for transferring messages from a sender program to a receiving program via a message queue. A message is sent from the sender program to the message queue manager. The message is defined to permit the message queue manager to select whether to treat the message transactionally or non-transactionally.

3 Claims, 5 Drawing Sheets ary processing on the message, and generate further messages. (IBM and WebSphere are trademarks of International Business Machines Corporation).

PERSISTENT MESSAGING IN A TRANSACTION PROCESSING ENVIRONMENT

FIELD OF THE INVENTION

The present invention relates generally to persistent messaging in a transaction processing environment.

BACKGROUND TO THE INVENTION

The asynchronous transfer of messages between application programs running different data processing systems within a network is well known in the art, and is implemented by a number of commercially available messaging systems. These systems include IBM Corporation's WebSphere MQ family of messaging products, which use asynchronous messaging via queues. A sender application program issues a PutMessage command to send (put) a message to a target queue, and a WebSphere MQ queue manager program handles the complexities of transferring the message from the sender to the target queue, which may be remotely located across a heterogeneous computer network. The target queue is a local input queue for another application program, which retrieves (gets) the message from this input queue by issuing a GetMessage command asynchronously from the send operation. The receiver application program then performs its processing on the message, and may generate further messages. (IBM and WebSphere are trademarks of International Business Machines Corporation).

Messaging can be persistent or non-persistent. In non-persistent messaging there is no assurance that the message will be delivered. In persistent messaging there is an assurance of delivery and in one technique, this is achieved by storing the message (often referred to as "hardening") to non-volatile memory (e.g. disk storage device) as part of the messaging process. This means that if the messaging system fails during the message transfer then the message can be recovered. Although persistent messaging prevents loss of messages, there is a significant overhead involved in hardening to disk. Where applications are not concerned about recovery of lost messages then non-persistent messaging is employed where the message data is not hardened to disk and the overhead involved in hardening is avoided.

Messaging can be transactional or non-transactional. Transaction processing is a well known technique and in general terms involves the execution of discrete units of work that access and update shared data. Logical points of consistency at which resource changes are synchronised within transaction execution are called commit points or syncpoints. An application ends a unit of work by declaring a syncpoint, or by the application terminating. The characteristic of a transaction being accomplished as a whole or not at all is known as 'atomicity'. Atomicity of a transaction is known to be achieved by resource updates made within the transaction being held uncommitted until a syncpoint is declared at completion of the transaction. That is, the resource updates are only made permanent and visible to applications other than the one which performed the updates on successful completion. If the transaction fails to complete successfully, then all changes that have been made to resources during the partial execution are removed—the transaction is said to rollback (or synonymously to backout), the resources being restored to the consistent state which existed before the transaction began. Any party (e.g. an application or resource manager) with an interest in the unit of work can cause a rollback when a syncpoint is declared by indicating unreadiness to commit.

In one example of transactional processing as applied to persistent messaging, a message is PUT 'inside' the syncpoint and when COMMITTED it is hardened to disk. A number of messages may advantageously be batched inside a single syncpoint and hardened to disk as a batch thus improving the efficiency of the operation. In one example of non-transactional persistent messaging, a message is PUT 'outside' syncpoint. When there is a corresponding GET waiting, the message will be transferred to the recipient thus resulting in an efficient message transfer.

Examples of transactional and non-transactional persistent messaging will now be described in more detail with reference to FIGS. 1 and 2. FIG. 1 represents an example of persistent messaging between Application A 10 and Application B 20 where a message is outside syncpoint. First, Application A PUTS 50 a message onto the queue controlled by queue manager 30. Because there is no corresponding GET from Application B already on the queue and the message is defined to be persistent and outside syncpoint, the PUT is immediately hardened onto non-volatile storage, represented in FIG. 1 by disk 100. The queue manager indicates 51 to Application A that the message has been PUT on the queue. At some later time, Application B sends 53 a GET to the queue for the message previously PUT there by Application A. As the GET is outside syncpoint, the Application A message is retrieved from the queue, hardened to disk and transmitted to Application B. Thus because there is no outstanding GET at the time of the PUT, this non-transactional message transfer involves two disk hardening operations for a single message transfer thus reducing the efficiency of the system.

If, as previously indicated, at the time the PUT from Application A was received by the queue manager, a corresponding GET from Application B had already been on the queue, the message could have been immediately transferred to Application B, thus avoiding the two hardening operations.

FIG. 2 represents an example of persistent messaging where the PUT is inside a syncpoint. First, Application B sends 55 a GET WAIT NO_SYNC to the queue manager. This GET waits on the queue for a corresponding PUT. In step 56, Application A PUTS the corresponding message on the queue. Because this message is inside a syncpoint, it is not visible to the GET until it has been committed and thus the message cannot be transferred to Application B. In the meantime, Application A issues a number of PUTs 56a,b,c inside syncpoint and finally COMMITS at step 57. At this point the four messages are hardened to disk which causes message 56 to become available to the corresponding GET 55. The removal of the message 55 is hardened to disk and the message 55 is transferred to Application B. Thus, whilst the disk hardening overhead has been decreased by PUTTING multiple messages inside syncpoint, the transfer of the initial PUT 55 to Application B has taken longer than if PUT 56 had been placed outside syncpoint.

As the sending application will invariably be unaware as to whether there is a GET waiting on the queue for a PUT it is about to send, it can inadvertently choose the less efficient syncpoint option for a particular message. In particular, when there is no outstanding GET it would be preferable to place the message inside syncpoint as placing it outside syncpoint would result in disk hardening operations for each PUT. On the other hand, when there is an outstanding GET, it would be preferable to place the message outside syncpoint as placing it inside syncpoint would result in unnecessary delay in message transfer. It would be desirable to ameliorate one or more of these disadvantages.

SUMMARY OF THE INVENTION

According to the invention therefore there is provided a method of sending a persistent message in a transaction-enabled messaging and queuing system comprising a message queue manager responsible for transferring messages from a sender program to a receiving program via a message queue, the method comprising the step of sending a message to a message queue manager, the message being defined so as to permit the message queue manager to select whether to treat the message transactionally or non-transactionally.

This technique finds especially advantageous use where the sender program is not concerned whether the message is inside or outside syncpoint and where the sender program may put multiple messages inside syncpoint.

When there is a waiting corresponding non-transactional GET on the message queue, the PUT is handled non-transactionally by transferring the message direct to the receiving program. Thus the delay in transferring the message when multiple messages are batched within a transaction is avoided.

When there is no waiting corresponding non-transactional GET request on the message queue, the message is handled transactionally by placing the message on the message queue and committing the message to non-volatile storage. In one embodiment, an indication is sent from the message queue manager indicating that the message is being handled transactionally. In this case, the sender program has the option of sending more messages within the transaction.

Alternatively, the sender program assumes that the message will be handled transactionally and sends further messages. If the message queue manager has determined to handle the message transactionally, subsequent messages that are defined as being inside syncpoint or syncpoint_optional may be placed in the transaction. If subsequent messages are defined as syncpoint_optional and there are one or more outstanding GET requests for the subsequent messages, then it makes sense for any matching PUTS to be handled non-transactionally. If the message queue manager has determined to handle the message non-transactionally, the subsequent messages will be handled according to their own syncpoint definitions.

According to another aspect of the invention there is provided a computer program product comprising a computer usable medium having computer readable program code means embodied therein for causing a transfer of persistent messages in transaction-enabled messaging and queuing system, the computer readable program code means in said computer program product comprising computer readable program code for sending a message to a message queue manager and for defining the message so as to permit the message queue manager to select whether to treat the message transactionally or non-transactionally.

The disclosed and claimed technique finds advantageous use in messaging environments where a sender application sends a message to multiple receivers i.e. a fan-out operation such as pub/sub (but only where transactional processing is not a requirement).

BRIEF DESCRIPTION OF THE DRAWING

A preferred embodiment of the invention will now be described by way of example only, with reference to the accompanying drawings in which.

DETAILED DESCRIPTION OF THE PREFERRED EMBODIMENT

Figure 5:
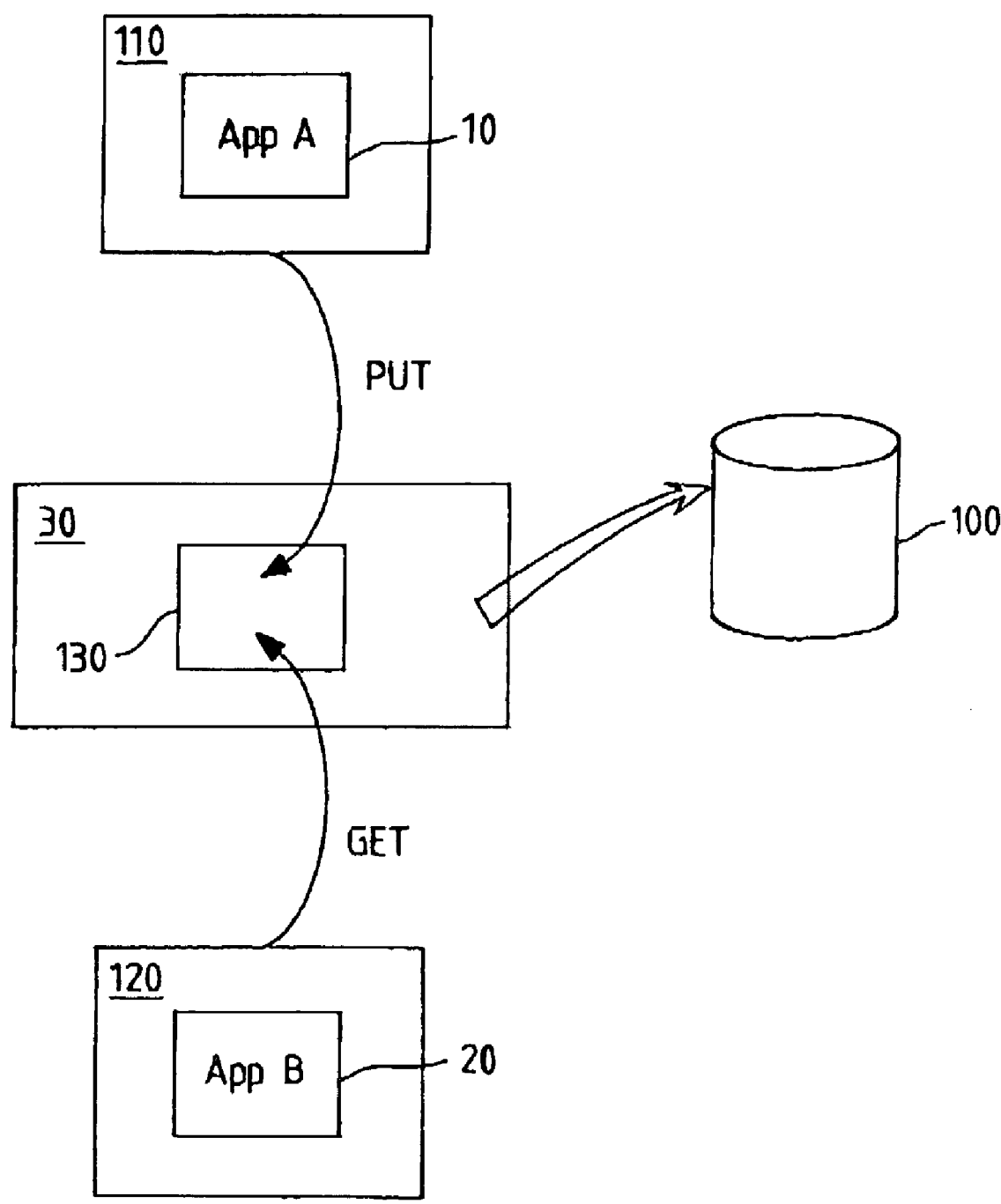
FIG. 5 is a schematic representation of a computer system in which the preferred embodiment of the invention may be employed.

FIG. 5 shows a messaging and queuing system in which the present invention may be employed. Application A 10 runs on a processor 110 and communicates with Application B 20 running on processor 120 via message queue manager 30 that provides and controls a message queue 130. A disk storage device 100 is provided for the storing of persistent messages though any other suitable non-volatile storage device may used for this purpose.

The message queue manager may be provided by the IBM Websphere MQ product or other messaging and queuing product, a number of which are available. Details of the general operation of the messaging and queuing product are not essential to an understanding of the present invention and are in any event available in numerous publications.

Figure 1:
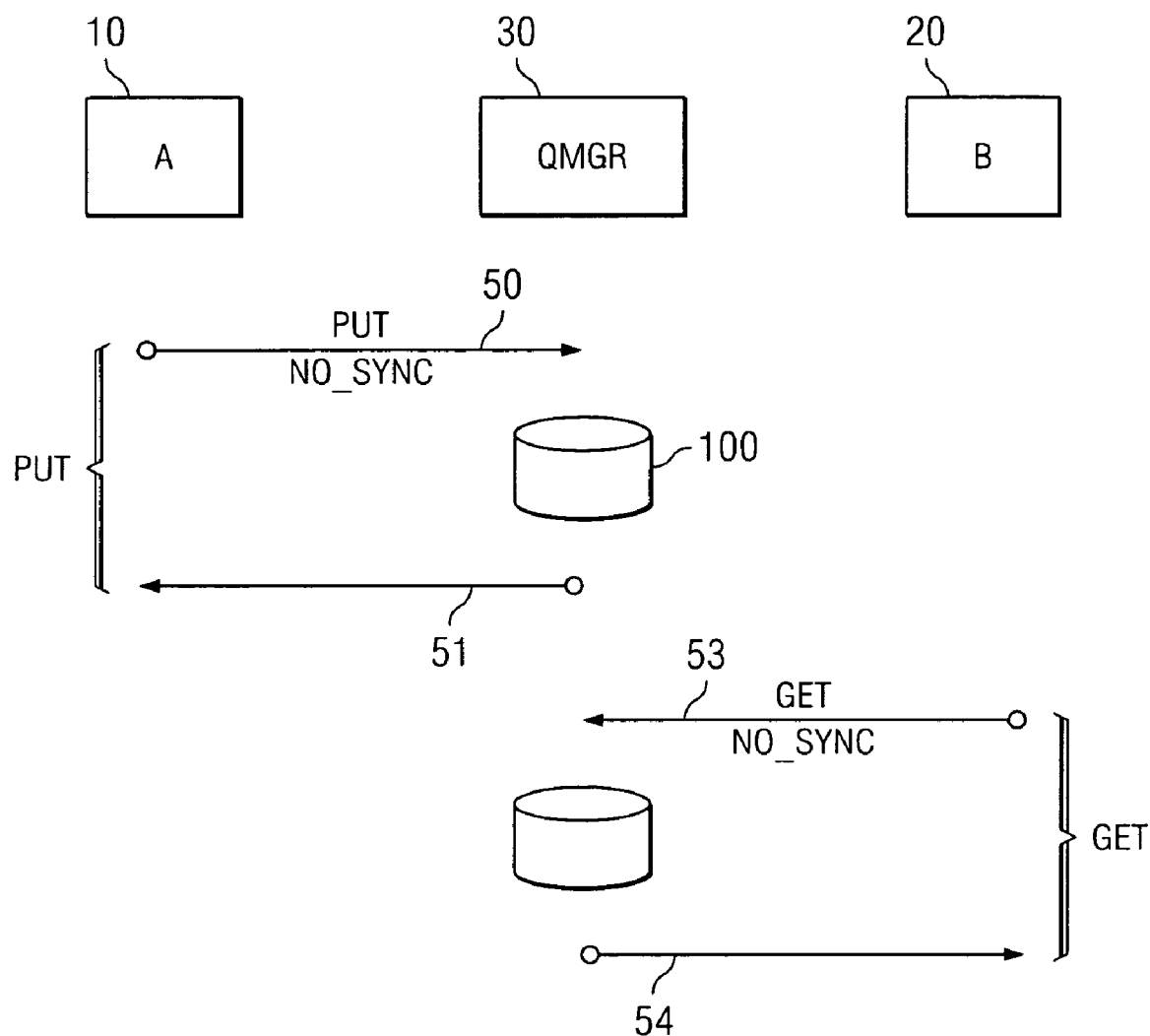
FIG. 1 is a representation of an example non-transactional (outside syncpoint) message flow between two applications, according to the prior art.
Figure 2:
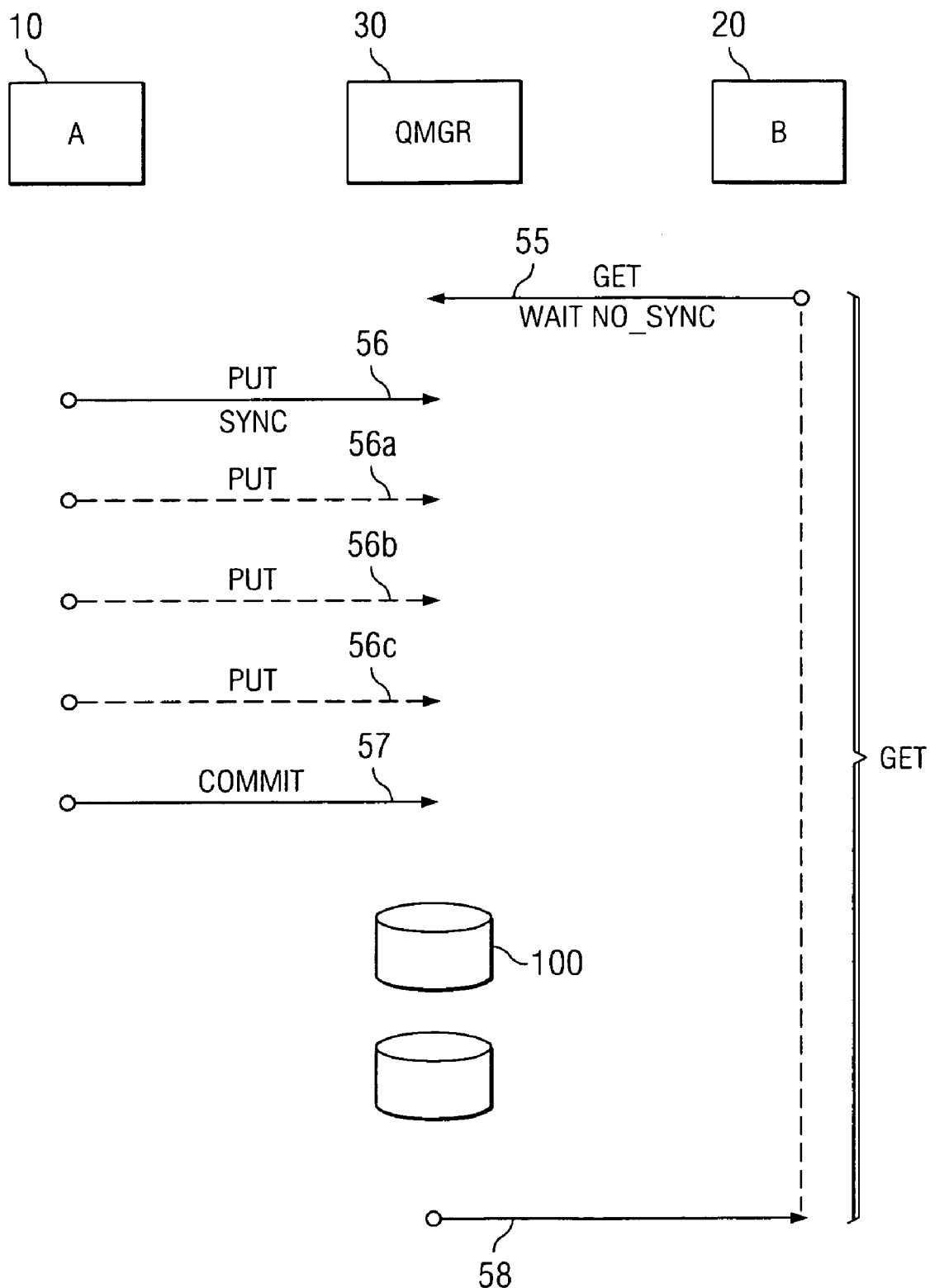
FIG. 2 is a representation of a example transactional message (inside syncpoint) flow between two applications, according to the prior art.
Figure 3:
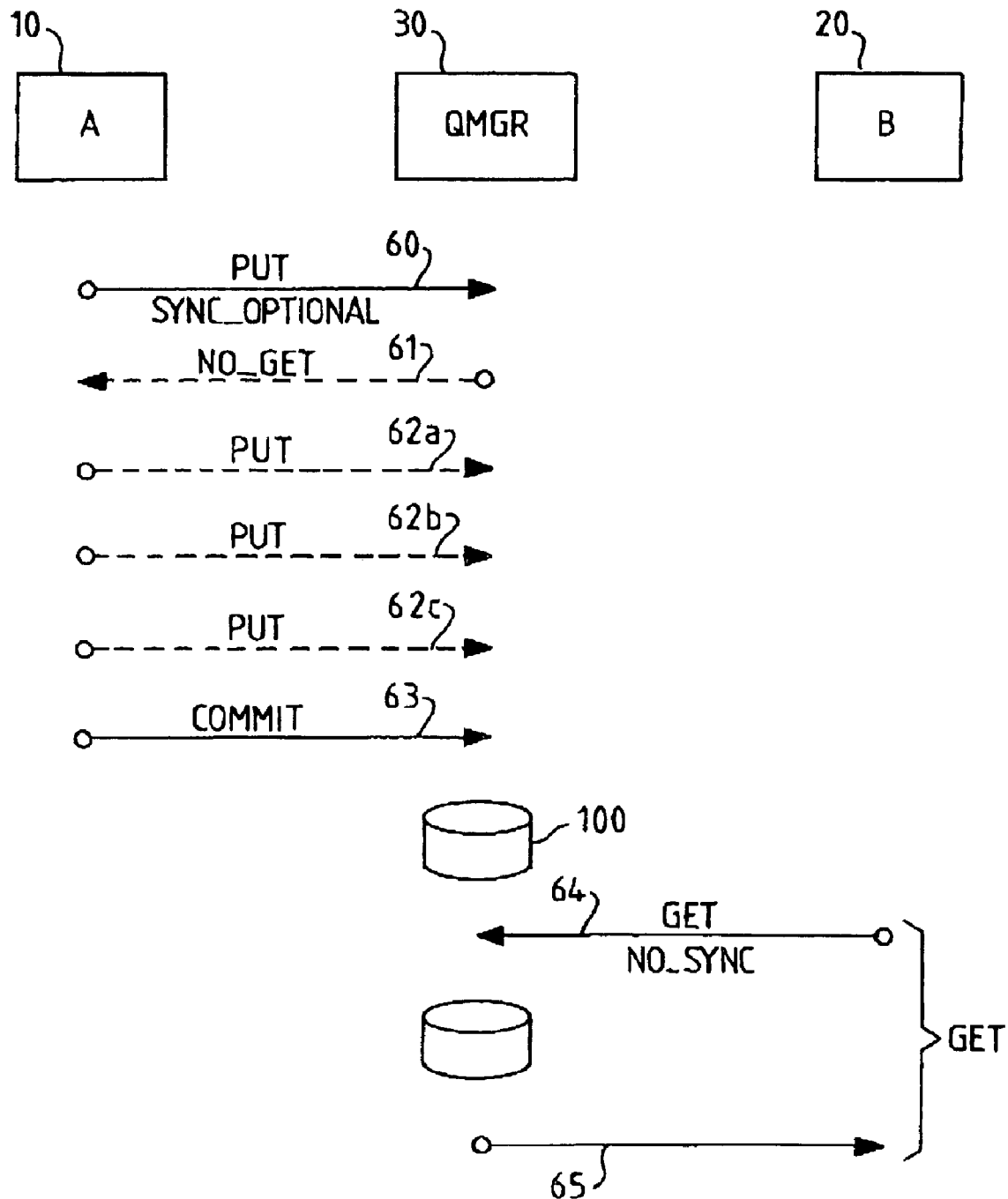
FIG. 3 is a representation of a syncpoint-optional message PUT where the receiving application has a non-transactional GET outstanding.

The technique of the preferred embodiment will next be described with reference to FIGS. 3 and 4. FIG. 3 shows the message flow when the PUT message is defined by Application A as SYNCPOINT_OPTIONAL and when there is no waiting GET on message queue 130. First, Application A sends a persistent PUT 60 to the queue manager and, in this case defines the PUT as SYNCPOINT_OPTIONAL as it does not require the message to be handled transactionally. The queue manager makes a determination that there is no corresponding GET from Application B and consequently chooses to handle the PUT transactionally. Optionally, the message queue manager responds to Application A with an indication 61 that the PUT is being handled transactionally. Application A then sends multiple PUTS 62a,62b,62c which are also defined as SYNCPOINT-OPTIONAL. As there are no outstanding GETs for any of these subsequent PUTS, the queue manager adds them to the syncpoint. Subsequently Application A sends a COMMIT 63 which causes the queue manager to harden messages 60, 62a, 62b and 62c to disk storage device 100.

Some time later, Application B issues a NO_SYNC GET 64 to the queue manager. As the corresponding PUT 60 is determined to be on the queue, the message removal is immediately hardened to disk 100 and the message corresponding to PUT 60 is sent 65 by the queue manager to Application B.

As an alternative to the sending of an indication 61, Application A may be arranged such that it assumes that a SYNCPOINT_OPTIONAL message will be handled transactionally and consequently continues to send messages to the message queue manager on the assumption that they will be placed within the unit of work that Application A assumes has been set up by the message queue manager. If a transaction has been initiated, then the messages will be placed inside syncpoint. If there is no such transaction, they will be handled according to their syncpoint definitions.

Figure 4:
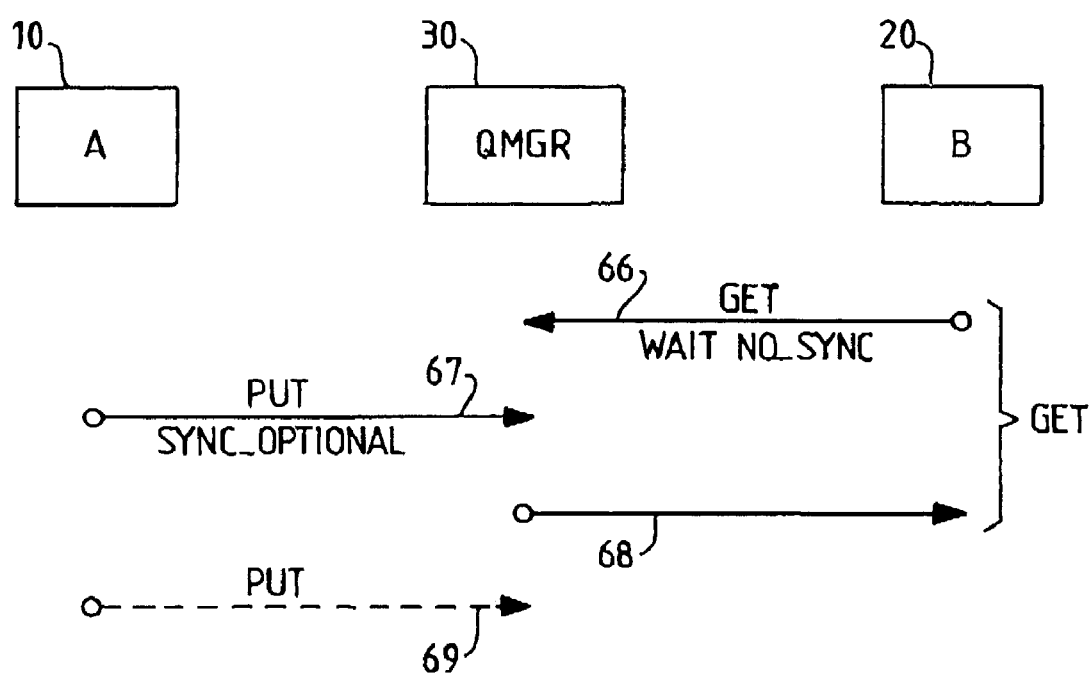
FIG. 4 is a representation of a syncpoint-optional message PUT where there is no waiting non-transactional GET.

FIG. 4 shows the message flow when the message from Application A is defined by Application A as SYNCPOINT_OPTIONAL and when there is a waiting GET on message queue 130. In this case, Application first issues a NO_SYNC WAIT GET 66 to the queue manager. The GET waits on the queue and subsequently Application A issues a PUT 67 which it defines as SYNCPOINT_OPTIONAL. The queue manager makes a determination that the corresponding GET is already on the queue and consequently chooses to handle the PUT as non-transactional in which case the Application A message is transferred 68 directly to Application B without being hardened to disk. Application A then continues by sending further PUTS 69.

The invention claimed is:

1. A method of sending a persistent message in a transaction-enabled messaging and queuing system comprising a message queue manager responsible for transferring messages from a sender program to a receiving program via a message queue, the method comprising the step of sending a message to the message queue manager; the message being defined by the sender program so as to permit the message queue manager to select whether to treat the message transactionally or non-transactionally;
   wherein the message is defined as syncpoint-optional;
   wherein the message queue manager selects to handle the message non-transactionally when there is a waiting corresponding receive message on the message queue and accordingly transfers the message direct to the receiving program; and
   wherein the message queue manager selects to handle the message transactionally when there is no waiting corresponding receive message on the message queue and accordingly places the message on the message queue and commits the message to non-volatile storage.

2. The method of claim 1 comprising the further step of providing an indication to the sender program that the message is being handled transactionally.

3. A computer program product comprising a computer storage medium having computer readable program code means embodied therein for causing a transfer of persistent messages in transaction-oriented environment, the computer readable program code means in said computer program product comprising;
   computer readable program code for sending a message to a message queue manager, wherein the message queue manager is responsible for transferring the message from a sender program to a receiving program via a message queue, the message being defined so as to permit the message queue manager to select whether to treat the message transactionally or non-transactionally;
   wherein the message is defined as syncpoint-optional;
   computer readable program code for selecting to handle the message non-transactionally by transferring the message direct to the receiving program when there is a waiting corresponding receive message on the message queue; and
   computer readable program code for selecting to handle the message transactionally by placing the message on the message queue and committing the message to non-volatile storage when there is no waiting corresponding receive message on the message queue.

* * * * *